UNITED STATES PATENT OFFICE.

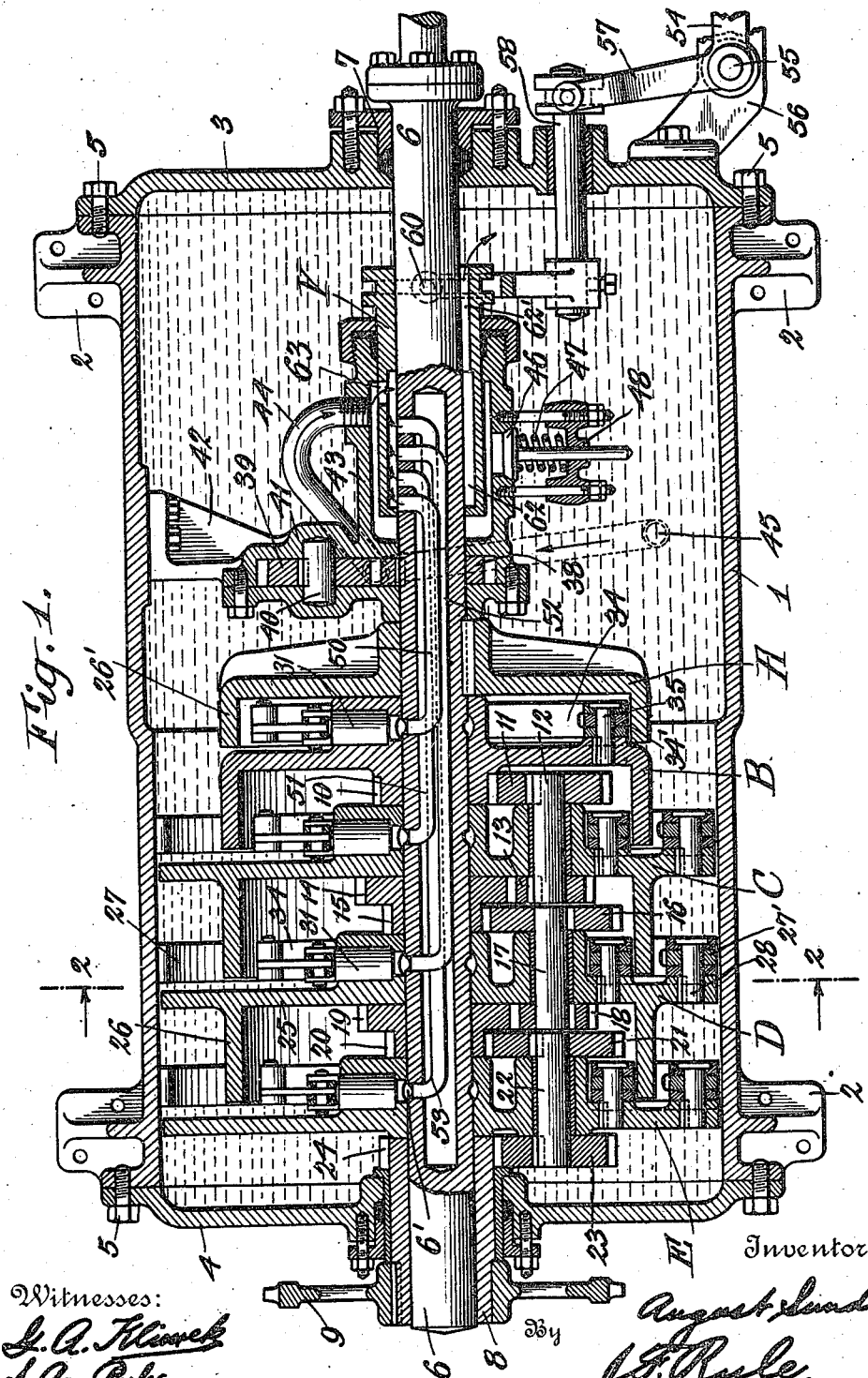

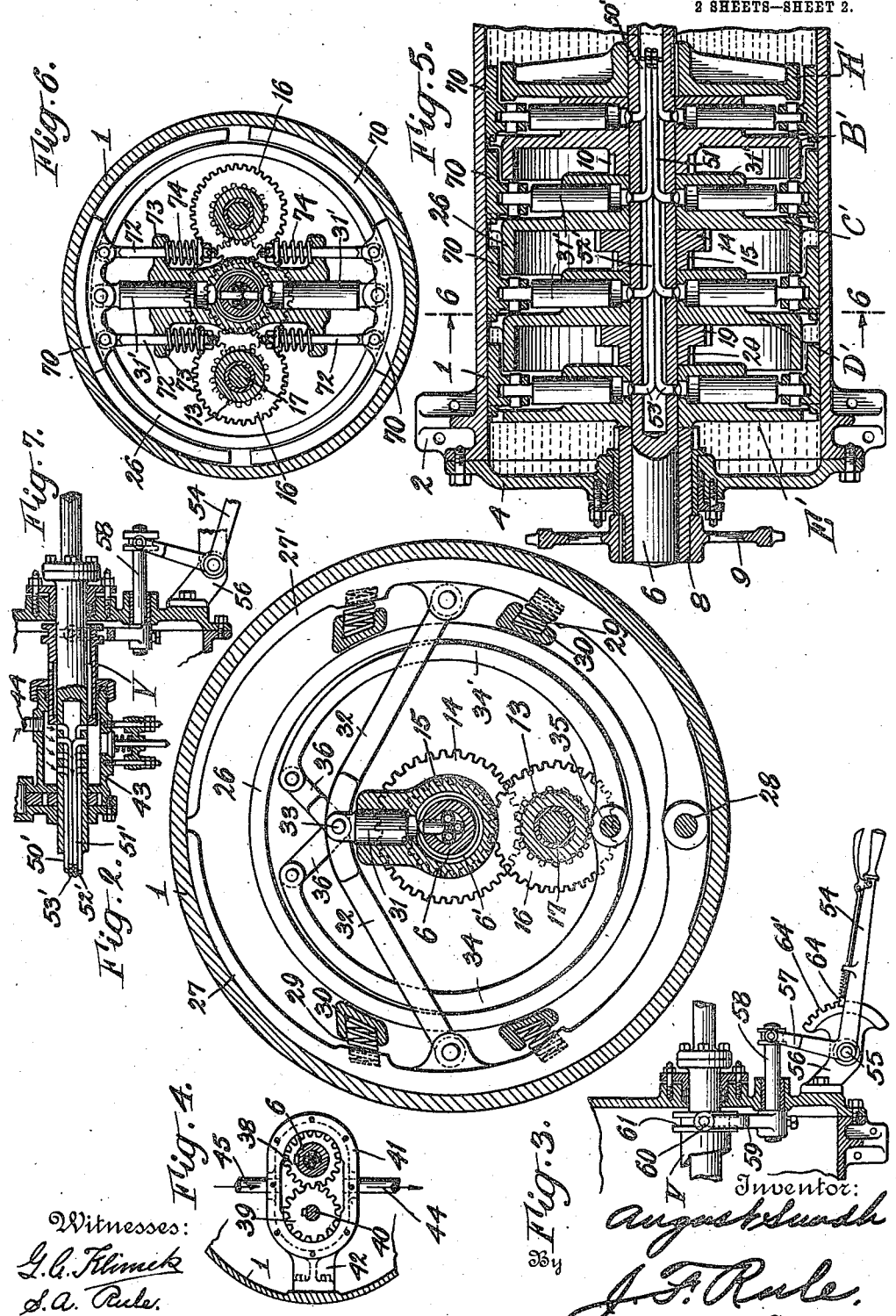

AUGUST SUNDH, OF YONKERS, NEW YORK.

FLUID-CONTROLLED POWER-TRANSMITTING MECHANISM.

963,092.

Specification of Letters Patent. Patented July 5, 1910.

Application filed August 5, 1909. Serial No. 511,383.

*To all whom it may concern:*

Be it known that I, AUGUST SUNDH, a citizen of the United States, residing at Yonkers, in the county of Westchester and State of New York, have invented a new and useful Fluid-Controlled Power-Transmitting Mechanism, of which the following is a specification.

My invention relates to mechanism for transmitting power at a variable speed and controlled by fluid operated means.

The invention is designed for use on automobiles, motor-boats, and the like, and is also adapted to be used with planers, lathes, and other tools, which are run at a variable speed and torque, and in general may be used wherever variable speed mechanism is required for transmitting power from a driving element to driven mechanism.

An object of my invention is to provide reliable speed and power changing gearing which can be operated without any danger of breaking and without the possibility of the gearing becoming interlocked as the speed is being changed, the speed of the driven mechanism being substantially inversely proportional to the driving torque applied thereto.

It is a well known fact that with speed changing gearing of the type now in common use, unless great care is exercised in operating the same to change the speed, the gear teeth may be stripped or the gear wheels become interlocked. The interlocking of the gears takes place when a driving gear is brought into mesh with a driven gear before being disengaged from the preceding gear.

My invention aims to effectively overcome these objections by providing a construction in which the power transmitting gear wheels are permanently intermeshed, the speed being varied without disconnecting any of the gear wheels or changing their relation.

Another object of the invention is to provide a construction in which the changes in the speed may be made smoothly under all conditions and so that if felt at all, they will be almost imperceptible.

The invention further aims to provide controlling mechanism for the speed changing gearing which does not require a skilled operator, and with which the manual labor required for operation is reduced to a minimum.

Other objects of the invention will appear hereinafter, the scope of the invention being defined in the appended claims in which are set forth the novel combination of elements. The arrangement of gears is similar to that shown and claimed broadly in my co-pending application for patent on magnetically controlled power transmission mechanism, Serial No. 511,382, filed Aug. 5, 1909.

Referring to the accompanying drawings, Figure 1 is a sectional plan view of a construction embodying my invention; Fig. 2 is a sectional elevation taken substantially on the plane indicated by the line 2—2 of Fig. 1; Fig. 3 is a detail view, on a reduced scale, of the controlling lever and associated parts; Fig. 4 is a detail view of the pump; Fig. 5 is a sectional plan view of a modification; Fig. 6 is a sectional elevation substantially as indicated by the line 6—6 of Fig. 5; and Fig. 7 is a view of the valve mechanism used with the construction shown in Fig. 5.

The gearing is inclosed in a cylindrical drum or casing 1 which may be made of cast iron or other suitable material, and is provided with feet 2 by means of which it may be bolted to a suitable support. The casing 1 is provided with removable end plates or heads 3 and 4 secured in position by means of bolts 5. A shaft 6, which may be termed the driving member, extends longitudinally through the center of the casing 1 and is journaled at one end in the head 3, a suitable stuffing-box or gland 7 being provided to prevent the escape of a liquid from within the casing, and also to form a bearing for the shaft. The power for operating the drive shaft 6 may be supplied by an internal combustion engine, an electric motor, or other prime mover, depending largely upon the kind of machinery that is to be driven. Loosely mounted on the free end of the shaft 6 is a sleeve 8 which, together with a sprocket wheel 9 keyed thereto, may be termed the driven member. The shaft 6 and sleeve 8 are adapted to be connected through a train of gearing, as will be fully described later. The sprocket wheel 9 may be connected by suitable gearing to the mechanism to be driven.

The gearing for transmitting power from the driving member to the driven member comprises a disk or clutch member A keyed to the driving member 6, and a plurality of disks or sections B, C, D and E loosely mounted on the driving member 6. The section D will first be described and then the differences between it and the other sections noted. As shown, this section comprises a body portion 25 provided with an annular flange 26, the inner surface of which forms a friction clutch face. On the front face of the disk 25 is an expansible clutch member comprising a pair of arms 27 and 27' connected to the disk by a pivot pin 28. The outer surfaces of these clutch arms are shaped to conform to the inner surface of the casing 1, and are normally held in frictional contact with the casing by means of coil springs 29. Each of these springs has one end in a recessed lug 30 formed on the disk 25, and the opposite end in a recess formed in the clutch arm. The clutch arms 27 and 27' are adapted to be disengaged from the casing 1 by means of a fluid motor comprising a piston 31 adapted to reciprocate in a cylindrical opening formed in the disk 25. A pair of links 32 are connected at their inner ends to the piston 31 by means of a pivot pin 33, and at their outer ends are pivoted to the clutch arms 27, 27'. An inner clutch member is also carried by the disk 25 and comprises a pair of arms 34 and 34' connected to the disk by a pivot pin 35. These arms are adapted to frictionally engage the flange 26 of the section C, but are normally held out of contact with said flange by links 36 connecting the free ends of the clutch arms to the pivot pin 33. Journaled in the disk D is a stud shaft 17 extending through the disk and having keyed to its front and rear ends respectively, toothed gear wheels 16 and 18. The section C is substantially like the section D and needs no detailed description. The section E is similar to the sections C and D except that the flange 26 is omitted. The section B is only provided with the inner pair of clutch arms 34, 34', which are adapted to engage the flange 26' formed on the clutch member A. The hub of the section B is provided with gear teeth forming a gear wheel 10. Between the sections C and D is a gear member consisting of gear wheels 14 and 15 secured together or formed in one piece and loosely mounted on the drive shaft 6. A similar member comprising gear wheels 19 and 20 is located between the sections D and E.

The motor pistons 31 are operated by liquid pressure supplied by a small gear-pump comprising a pair of intermeshing pump gears 38 and 39, (see Figs. 1 and 4). The gear 38 is keyed to the shaft 6, and the gear 39 is mounted on a shaft 40 journaled in the pump casing 41. The latter, as shown, is provided with an integral bracket 42 bolted to the drum 1. The pump casing 41 is provided with a cylindrical extension 43 surrounding the drive shaft and forming a pressure chamber for the pump. A pressure pipe 44 leads from the lower or pressure side of the pump casing 41 to the pressure chamber 43. A supply pipe 45 extends from a point near the bottom of the drum 1 to the upper or intake side of the pump. A relief valve 46 is provided to prevent excessive pressure of the liquid in the pressure chamber 43. This valve is normally held to its seat by a spring 47 which bears at one end against the valve and at its opposite end against an adjustable support 48. By adjusting the support 48, the tension of the spring may be varied as desired.

Within the drive shaft 6 which is hollow, as shown, are tubes 50, 51, 52, 53, the right hand ends of which open into the pressure chamber 43, and the opposite ends of which communicate respectively with the motor cylinders of the sections B, C, D, E. These sections and the shaft 6 are provided with annular recesses 6' at the ends of the tubes in order to maintain the tubes continually in communication with the motor cylinders as the shaft rotates.

Mounted on the drive shaft is a slide valve V in the form of a sleeve, which is slidable longitudinally of the drive shaft. This valve is operated by means of a hand lever 54 (see Fig. 3), pivoted at 55 to a bracket 56 bolted to the casing 1. The lever 54 has a bifurcated arm 57 in engagement with a rod 58 extending through the head 3 of the casing and slidable longitudinally therein. The inner end of the rod 58 carries a bifurcated arm 59 which straddles the valve V and is provided with lugs 60, which extend into an annular recess 61, formed on the valve V. When the slide valve is in its innermost position, as shown in Fig. 1, an annular space 62 formed between the valve and drive shaft, is in communication with the pressure chamber through a port 63, and with the exterior of the valve through a port 62'. The operating lever 54 is provided with a latch 64 coöperating with a rack 64' for locking the valve V in any desired position.

The operation of the invention will be understood from the following description:—Assuming that the various parts are in the position shown in Figs. 1 and 2, and that the driving shaft 6 is being rotated at a practically constant speed by any suitable motor, the gear pump will operate to cause a local circulation of the liquid within the drum 1. The pump operates in a well understood manner to draw the liquid in through the intake pipe 45 and force it through the pipe 44 into the pressure chamber. The latter being open through the ports 63 and 62' to the drum, the liquid can circulate freely so that very little power is used in driving the pump. The clutch member A at this time rotates freely with the drive shaft, and the latter rotates freely within the disks B, C, D, E, and also the driven member or sleeve 8, so that no motion is transmitted to the driven mechanism. The disks C, D, E are held against rotation by the outer friction clutches, which at this time, are held against the casing 1. If now, the controlling lever is operated to move the valve V outwardly, the tube 50 will first be opened to the pressure chamber and the port 63 closed. This cuts off the free circulation, and the liquid under pressure from the pump will be forced through the tube 50 and operate the motor piston 31 of the section B. The clutch arms 34 and 34' of this section will therefore be brought into frictional engagement with the disk A and thereby cause the section B to rotate with the drive shaft. The motion is now transmitted through the train of gears to the driven member as follows:—The gear 10 rotates the gear 11 and with it the shaft 12 and pinion 13. The latter drives the gears 14 and 15 at a reduced angular velocity, and the gear 15 drives the gears 16 and 18. The gear 18 drives the gears 19 and 20 with a further reduction in speed. The gear 20 drives the gears 21, 23 and 24, thereby rotating the sprocket wheel 9. It will thus be seen that there is a positive driving connection from the disk B to the sprocket wheel 9. Each gear at this time rotates about its own axis, and owing to the relative diameters of the gears, the speed of the driven member is only a fraction of that of the drive shaft. If now, the valve V is moved outwardly another step, the pipe 51 will be opened to the pressure chamber, and cause the motor piston 31 carried by the section C to be moved outwardly and operate the outer and inner clutch members. That is, the outer clutch arms 27 and 27' are withdrawn from the casing 1 and permit the section C to rotate, and the inner clutch arms 34, 34' are moved into frictional engagement with section B. The disks A, B and C are now held by the friction clutches against independent rotation, so that they rotate together with the drive shaft as a unit. As the disks B and C are clutched together, the gears 11 and 13 are locked against rotation about their own axis. The gear 13, in turn locks the gears 14 and 15 against rotation independently of the section C. In other words, the gears 14 and 15 are now connected to rotate with the drive shaft 6, and at the same angular velocity. The motion is transmitted from the gear 15 through the gears 16, 18, 19, etc. to the sprocket wheel 9, the same as before the section C was released from the casing. The speed of the driven member however is increased as the gears 14 and 15 are driven at a higher speed than when operated by the rotation of the speed reducing gears 11 and 13. If the valve V is given the further movement to the right so as to open the pipe 52 to pressure, the clutches carried by the section D will be operated to release said section from the drum 1 and connect it to the section C so that it will be rotated. The gears 16 and 18 are now locked as the gears 11 and 13, so that the gears 19 and 20 rotate with the drive shaft, thereby effecting a further increase in the speed of the driven mechanism. The final movement of the valve V to the right causes the clutches carried by the section E to operate and release said section from the drum 1, and connect it to the section D. The sections A, B, C, D, E are now all locked together and to the drive shaft, and rotate as a unit. The gears 21 and 23 being locked against rotation about their own axis, carry the sleeve 8 and sprocket wheel 9 with the clutch disks so that these parts are rotated at the same velocity as the drive shaft. The clutch carrying disks rotating together act as a fly wheel for the internal combustion engine or other prime mover from which the power is supplied.

By moving the slide valve back toward initial position, the pipes 53, 52, 51 and 50 are successively cut off from the pressure and connected through the annular space 62 and port 62' with the exhaust side of the pump. When the pipe 53 is connected with the exhaust, the pressure on the motor piston in the section E is removed and the springs 29 apply the outer clutch arms to the casing 1 and release the inner clutch arms from the flange 26 on the section D, thereby effecting a reduction in the speed of the driven member. As the pipes 52, 51 and 50 are connected to the exhaust, the speed is further reduced and the drive shaft finally disconnected from the driven member. Any desired intermediate speed may be maintained by locking the controlling lever 54 in a corresponding position. The latch 64 is adapted to engage a separate notch in the rack 64' for each speed of the gearing. Obviously the number of intermediate steps between the fast and slow speed may be increased or decreased by correspondingly varying the number of disks employed. The change in speed for each step may be varied as desired, by varying the relative sizes of the gears.

The gear pump herein shown is preferred to other forms of pumps, as it is well adapted for this use, although it will be understood that other forms of pumps might be used. It will be observed that packings for the fluid operated devices are dispensed with, thereby simplifying the mechanism and avoiding the annoyance and work as well as the expense incident to keeping packings in proper condition. As the gear pump is operated continuously, pressure will be constantly applied to the motor pistons while their ports are open to the pressure chamber, and any leakage that may occur will be provided for. Any surplus liquid pumped into the pressure chamber finds its escape at the relief valve 46. The power consumed by the gear pump is very small, whereas the advantage obtained by having the fluid circulated continuously, and thereby dispensing with troublesome packings, as before indicated, is of considerable practical importance. The liquid employed is preferably a lubricating oil which serves to keep all of the bearings and the movable parts well lubricated. The oil also by keeping the clutch surfaces well lubricated insures a smooth operation of the clutches, so that the changes in speed as the clutches are operated, are gradual and free from any jerkiness. The amount of oil may be sufficient to fill the casing, as shown, but may be varied within wide limits, and in practice will ordinarily be enough to half fill the casing or somewhat less.

In Figs. 5 and 6, also 7, is shown a modified construction comprising a different form of clutch mechanism. Each of the sections B', C', D' and E' is provided with two piston motors for operating the clutches, the motors being connected to the liquid pressure supply by pairs of tubes 50', 51', 52' and 53'. Each of the motor pistons 31' has pivoted at its outer end a clutch member 70 which extends over the outer surface of the adjacent flange 26. Rods 72 are connected to the clutch members 70 on opposite sides of each piston, and extend through lugs 73. Springs 74 are mounted on these rods between said lugs and washers on the ends of the rods. When the liquid pressure is cut off from the motor pistons 31', the springs 74 hold the clutch members 70 in frictional contact with the flange 26, and when pressure is applied to the pistons they release the clutch members 70 from the disk flanges and move them into engagement with the casing 1. As shown in Fig. 6, two sets of the gear wheels 16, etc., carried by the rotating disks, may be provided. This makes a stronger construction and provides an evenly balanced arrangement of the gearing, and is especially adapted for heavy service. Obviously, two or more sets of these gear wheels might also be used in connection with the form of clutch mechanism shown in Figs. 1 and 2.

The operation of the construction shown in Figs. 5 and 6 is similar to that already described in connection with Figs. 1 to 4. It will be noted however, that in this instance, liquid pressure on the motor pistons is initially required to hold the clutch members against the casing 1. The valve V is therefore initially held in its outermost position, as shown in Fig. 7, so that pressure is supplied through the pipes 50', 51', 52', 53', to the motor pistons. As the valve V is moved inwardly, the pipes 50' are first connected with the exhaust and permit the clutch members 70 carried by the section B' to be released from the casing and moved into frictional contact with the disk A. The section B' will therefore be rotated with the drive shaft and the gear 10 will act as the driving gear, the motion being transmitted through the train of gears to the driven member as explained in connection with Fig. 1. The continued inward movement of the valve V permits the operation of the clutch members carried by the section C', D' and E' to successively release said sections from the casing and connect them to the preceding sections, thereby effecting the acceleration of the driven mechanism.

Various changes in the details of construction and arrangements of parts might be made by those skilled in the art without departing from the spirit and scope of the invention. I wish therefore not to be limited to the particular constructions herein disclosed.

What I claim as new and desire to secure by Letters Patent of the United States, is:—

1. The combination with a driving element and a driven element, of a train of gears connecting said elements, clutch mechanism controlling the relative movement of said gears, and means for operating said clutch mechanism by liquid pressure.

2. The combination with a driving element and a driven element, of a train of gearing forming a mechanical driving connection between said elements, and means operable by fluid pressure for varying the relative speed of said elements without breaking said connection.

3. In power transmitting mechanism, the combination with a driving member and a driven member, of a train of gears connecting said members, and means operated by fluid pressure for effecting a variation in the relative movement of the gears without breaking said connection.

4. In power transmitting mechanism, the combination with a driving element and a driven element, of a train of gears forming a positive mechanical driving connection between said elements, and means operated by fluid pressure for varying the relative movement of said gears and thereby varying the relative speeds of said elements without interrupting the continuity of said train of gears.

5. In power transmitting mechanism, the combination with a driving member and a driven member, of gearing connecting said members, clutch mechanism controlling the operation of said gearing and operable to vary the relative speed of said members without breaking said connection, a pump operated by said driving member, and means operated by liquid pressure from the pump for operating said clutch mechanism.

6. In power transmitting mechanism, the combination of a driving element, a driven element, rotary members, clutch mechanism, fluid motors, a pump connected to the driving element, and operating connections between said parts.

7. In power transmitting mechanism, the combination with a driving member and a driven member, of intermediate gearing for operating the driven member at different speeds relative to the driving member, and fluid pressure mechanism operated by the driving member for controlling the speed of the driven member without disconnecting any of said gearing.

8. In power transmitting mechanism, the combination with a plurality of rotary members, a train of gears forming a connection between said members, fluid motors carried by said members, and means operated by said motors for varying the relative speed of said members without breaking said connection.

9. In power transmitting mechanism, the combination with a stationary support, of a plurality of rotary members, gearing between said members, clutch mechanism operable to clutch said members to said support and to disengage them from the support and connect them together, and means for operating said clutch mechanism by fluid pressure.

10. In power transmission mechanism, the combination with a casing, of a plurality of members rotatable within the casing, clutch mechanism carried by one of said members and operable to disconnect it from the casing and connect it with the other member or vice versa, and a fluid motor for operating said clutch mechanism.

11. In power transmitting mechanism, the combination with a rotary member, of inner and outer expansion clutches carried thereby, a fluid motor carried by said member, and operating connections between the motor and said clutches.

12. In power transmitting mechanism, the combination with a stationary cylindrical casing, of a member rotatable within the casing, a rotatable disk provided with an annular flange adjacent said member, expansion clutches carried by said member and movable into frictional contact with the casing and said flange respectively, and means for operating said clutches by liquid pressure.

13. In power transmitting mechanism, the combination with a casing, of a train of gears comprising rotary members within the casing, clutch mechanism operable to connect said members with the casing, and means for operating said clutch mechanism by liquid pressure.

14. In power transmitting mechanism, the combination with a train of gears, of clutch mechanism operable to vary the relative speed of said gears, and means for operating the clutch mechanism by liquid pressure.

15. In power transmission mechanism, the combination with a driving member and a driven member, of a train of gears forming a driving connection between said members, and means operable by fluid pressure to successively interlock gears in said train.

16. In power transmitting mechanism, the combination with a drive shaft, of a plurality of rotary disks mounted thereon, clutch mechanism carried by the disks, fluid motors operatively connected to the clutch mechanism, means for supplying fluid pressure to the motors, and a single train of gearing controlled by said disks.

17. In power transmitting mechanism, the combination with a hollow drive shaft, of members rotatably mounted thereon, clutch mechanism carried by said members, motor pistons connected to the clutch mechanism, individual means for supplying a fluid under pressure through the hollow drive shaft to the several motor pistons, and gearing controlled by said members.

18. In power transmitting mechanism, the combination with a drive shaft and a driven element, of a train of gearing interposed between said parts, clutch mechanism associated with said gearing, liquid motors for operating said clutch mechanism a pump connected to be driven by the drive shaft, and individual means for transmitting liquid pressure from the pump to any desired number of said motors.

19. In power transmitting mechanism, the combination with a drive shaft, of a train of gearing comprising a plurality of rotary members, clutch mechanism carried by said members, liquid motors connected to the clutch mechanism, a pump connected to the drive shaft, and valve mechanism operable to successively connect the motors with the pressure side of the pump and maintain the motors collectively in such connection.

20. In power transmitting mechanism, the combination with a casing, of a lubricating fluid within the casing, a driving member, power transmitting apparatus within the casing, clutch mechanism associated therewith, a pump connected to said driving member and operable to circulate said lubricating fluid, motors for operating said clutch mechanism, and means for transmitting fluid pressure from the pump to the motors.

21. In power transmitting mechanism, the combination with a casing, of clutch mechanism therein, a driving member, a pump located within the casing and connected to the driving member, a pressure chamber, motors for operating the clutch mechanism, passages leading from the motors to the pressure chamber, a valve, and means for moving the valve into position to successively cut off said passages from the pressure chamber.

22. In power transmitting apparatus, the combination with a stationary casing, of a lubricating liquid therein, a drive shaft extending in the casing, a train of gearing connected to the drive shaft, clutch mechanism controlling said gearing, motors connected to the clutch mechanism, a pump, a pressure chamber in communication with the pressure side of the pump, ducts leading from the motors to the pressure chamber, a slide valve, means located outside of the casing for moving said valve into positions to successively cut off said ducts from the pressure chamber, and a relief valve opening from the pressure chamber into the casing.

23. In power transmitting mechanism, the combination with a cylindrical casing, of a shaft extending through the center of the casing, bearings for the shaft, a plurality of cylindrical members mounted on the shaft, gears carried by said members, gears mounted directly on the shaft and co-acting with the first named gears, clutch mechanism carried by said cylindrical members and operable by fluid pressure, and pumping mechanism operable to supply fluid pressure to the clutch mechanism.

24. The combination with a driving element and a driven element, of a train of gears connecting said elements, clutch mechanism controlling the relative movement of said gears and operable to vary the relative speed of said elements without breaking said connections, and means for operating said clutch mechanism by liquid pressure.

25. In power transmission mechanism, the combination with a casing, of a plurality of members rotatable within the casing, clutch mechanism carried by one of said members and operable to disconnect from the casing and connect with the other member or vice versa, power transmitting means forming a connection between said members, and a fluid motor for operating said clutch mechanism.

26. In power transmitting mechanism, the combination with a stationary cylindrical casing, of a member rotatable within the casing, a rotatable disk provided with an annular flange adjacent said member, expansion clutches carried by said member, and movable into frictional contact with said casing and said flange respectively, gearing forming a driving connection between said disk and rotatable member, and means for operating said clutches by liquid pressure.

27. In a power transmission device, the combination of a driving member and a driven member, power transmitting mechanism between said members, a fluid pressure motor connected to the driving member, and means operated by fluid pressure supplied by said motor for changing the speed and power transmitted between said members.

28. In power transmission mechanism, the combination of a driving member and a driven member, of gearing between said members, clutch mechanism controlling the operation of said gearing, fluid motors for operating the clutch mechanism, a pump connected to the driving member, means for connecting and disconnecting the motors with the pressure side of the pump, and means for permitting a free circulation of fluid through the pump when the motors are disconnected.

29. In power transmitting apparatus, the combination with a plurality of clutch mechanisms, fluid motors coöperating with said mechanisms, a pump, means for conveying fluid from the pump to said motors, a valve movable from an initial position into positions to successively connect the motors on the pressure side of the pump and maintain such connections until the valve is moved back toward initial position, and gearing controlled by said clutch mechanism.

30. The combination with a driving element, and a driven element, of a train of gearing forming a mechanical driving connection between said elements, means for supplying fluid pressure, and means operable by said fluid pressure for varying the relative speed of said elements without breaking said connection.

31. In power transmitting mechanism, the combination with a driving member and a driven member, of a train of gears connecting said members, fluid pressure generating means, and means operated by said fluid pressure for effecting a variation in the relative movement of the gears without breaking said connection.

In testimony whereof I have signed my name to this specification in the presence of two subscribing witnesses.

AUGUST SUNDH.

Witnesses:
JOHN F. RULE,
J. A. SUPLISKI.